US007014563B2

(12) United States Patent
Stephan et al.

(10) Patent No.: US 7,014,563 B2
(45) Date of Patent: Mar. 21, 2006

(54) GAMING MACHINE CANDLE DEVICE

(75) Inventors: Donald C. Stephan, Carson City, NV (US); Albert Hanis, Las Vegas, NV (US); Warren Tripp, Sparks, NV (US); Kevin Furry, Rancho Cordova, CA (US)

(73) Assignee: Innovative Gaming Corporation of America, Las Vegas, NV (US)

( * ) Notice: Subject to any disclaimer, the term of this patent is extended or adjusted under 35 U.S.C. 154(b) by 293 days.

(21) Appl. No.: 09/967,324

(22) Filed: Sep. 28, 2001

(65) Prior Publication Data

US 2003/0064814 A1 Apr. 3, 2003

(51) Int. Cl.
*A63F 9/24* (2006.01)

(52) U.S. Cl. .......................................... 463/47; 463/20
(58) Field of Classification Search ................. 463/47, 463/1, 11–43; 362/29, 227, 228, 234, 255, 362/156, 235–248; 345/170, 1–100; 200/313; 116/279, 222; 40/1, 446; 340/323 R
See application file for complete search history.

(56) References Cited

U.S. PATENT DOCUMENTS

| | | | | |
|---|---|---|---|---|
| 4,380,880 A | * | 4/1983 | Gandy | 40/564 |
| 4,829,407 A | * | 5/1989 | Bushell et al. | 362/29 |
| 4,884,351 A | * | 12/1989 | Abramson | 40/611.05 |
| 4,921,427 A | * | 5/1990 | Dunn | 434/340 |
| 5,277,307 A | * | 1/1994 | Kelly | 206/772 |
| 5,397,125 A | * | 3/1995 | Adams | 463/20 |
| 5,576,078 A | * | 11/1996 | Schatz | 428/13 |
| 5,605,506 A | | 2/1997 | Hoorn et al. | |
| 6,015,124 A | * | 1/2000 | Loy | 248/220.31 |
| 6,135,884 A | * | 10/2000 | Hedrick et al. | 463/20 |
| 6,558,013 B1 | * | 5/2003 | Tholin et al. | 362/29 |
| 6,578,301 B1 | * | 6/2003 | Ericson | 211/119.005 |
| 6,604,838 B1 | * | 8/2003 | Jautz | 362/225 |
| 2002/0159257 A1 | * | 10/2002 | Grajcar | 362/231 |

FOREIGN PATENT DOCUMENTS

GB 2316216 A * 2/1998

OTHER PUBLICATIONS

Refraction of Light [online] Dec. 31, 2003 [retrieved on Nov. 25, 2004]. Retrieved from the internet: <URL:http://www.ps.missouri.edu/rickspage/refract/refraction/html>.*
Bill Burton, "Slot Candles Light The Way", Casino Gambling website, Jul. 24, 2000 3 pages.

* cited by examiner

*Primary Examiner*—Julie Brocketti
(74) *Attorney, Agent, or Firm*—Rob L Phillips; Greenberg Traurig

(57) ABSTRACT

The present invention relates to a gaming machine candle device. Gaming machines utilize electric "candles" placed thereon to inform patrons of a machine's particular denomination. In other words, yellow signifies a quarter machine and red a nickel machine. The improved candle device described herein uses colored and transparent plastic plates in conjunction with light emitting diodes (LEDs) to more visibly and aesthetically inform patrons. A first transparent colored plate is illuminated to signify the machine's denomination. A second plate behind said first plate is used to inform gaming machine operators of concerns with said machine or player. Said second plate may also display words or logos affiliated with operators, manufacturers or the like. Frosting and beveling techniques along edges and surfaces of said plates cause LED light to refract highlighting those areas. A transparent second plate permits the color of said first plate to be viewed throughout a gaming establishment.

16 Claims, 5 Drawing Sheets

GAMING MACHINE CANDLE DEVICE

FIELD OF INVENTION

The present invention relates generally to the field of wagering style casino games. More particularly, this invention relates to a gaming machine including an improved candle device for informing players of the denomination of said gaming machine and informing operators of functional concerns with said gaming machine.

DESCRIPTION OF THE PRIOR ART

Slot machines and video machines have become the most popular and profitable gaming machines found in casinos. As such, improvements are continually sought by manufacturers and operators of said gaming machines. A common problem associated with slot and video machines is that the machines each have different denominations of play, namely nickels, quarters, half-dollars and dollars. In reality, individual players prefer different denominations of play.

In an effort to assist players in locating a specifically denominated gaming machine, operators have placed identically denominated gaming machines in carousals or banks. Therefore, once a player locates a preferred denominated machine, several other identically denominated machines are close by. However, often times as space becomes limited, operators place more and more machines, of different denominations, in the same location.

In a further effort to assist players in locating a specifically denominated gaming machine, slot or gaming machines incorporate light fixtures on a top of the machines. Said light fixtures are commonly referred to as candles. The candles typically have two separate regions capable of emitting light throughout a 360° continuum as disclosed in U.S. Pat. No. 5,605,506 to Hoorn et al. Normally, an upper region when lit indicates that a player requires change at that specific machine or some other concern. A lower colored region denotes the denomination of the specific machine. For example, red refers to a nickel machine, yellow a quarter machine, gold a half-dollar machine and blue a dollar machine. The current candle color system is sometimes not visible and, therefore, difficult to locate in a casino of flashing lights.

It is common place in a casino to observe a player place a quarter into a dollar machine only to see the coin drop harmlessly into the machine's hopper. Of course, in most cases the player may repeat the event two or three times until realizing they are at a dollar machine rather than a quarter machine.

The last bastion of hope for players is to read the pay table on a front portion of a machine. Unfortunately, a player will have to be adjacent the machine to read the pay table which is time consuming if a player is simply trying to identify a specific denominated machine.

Other than the carousels, pay tables and current candle devices, players must randomly search through a maze of gaming machines, gaming tables and crowds until luck intercedes and the proper machine is stumbled upon.

The present invention improves upon the colored candle device to more visibly and aesthetically inform players of the denomination of a particular game or inform gaming machine operators of functional concerns. A dual piece plexiglass unit is illuminated by LED lamps colored to reflect a machine's denomination. In addition, the plexiglass unit can display words or logos as desired by the machine's manufacturer, operator or the like.

The present invention solves the aforementioned shortcomings of the gaming machine candle by providing a more visible and varietal candle device. The present invention also incorporates a means of displaying words or logos adjacent the colored denomination portion.

SUMMARY OF THE INVENTION

An object of the present invention is to provide an improved gaming machine candle device for informing casino patrons of a denomination of a gaming machine.

Another object of the present invention is to provide an effective method of displaying a gaming machine denomination.

Another object of the present invention is to provide an easily observable gaming machine denomination within a casino environment.

Another object of the present invention is to provide a means of displaying words or logos adjacent a display of a gaming machine denomination.

Another object of the present invention is to provide gaming machine operators a more visible indication that a gaming machine or gaming machine player has encountered a problem.

Another object of the present invention is to provide gaming machine operators a more visible indication that a gaming machine has been opened or tampered with in a similar improper manner.

Other objects of the present invention will become apparent from the following detailed descriptions, figures and claims.

DISCLOSURE OF THE INVENTION

This invention relates to a candle device for displaying a gaming machine denomination. A first and second plate create a display format for providing information, including a traditional color-coded denomination scheme, related to a gaming machine. A first plate is transparent and colored to the denomination of a gaming machine. A second taller plate placed behind said first plate is transparent and displays words or logos such as the name of the game or the manufacturer's logo. The second plate is designed to flash in the event the gaming machine is open or otherwise tampered with improperly. Further, a player may signal the attention of an attendant by pushing a button on the gaming machine, as known in the art, that causes the second plate to light.

Said plates are lighted by light emitting diodes (LEDs) placed within recesses of said plates near lower edges of said plates. The use of LEDs provides a long-lasting inexpensive method of lighting said plates. In addition, the amount of light emitted by LEDs in proportion to the electrical current supplied has been gradually improved thereby permitting the implementation of the highly visible candle device of the present invention. A further benefit of LEDs is that the light is directional to maximize the candle's effectiveness.

Two clamping devices secure said plates to a base unit. Said clamping devices further secure LED boards to said base unit sub-adjacent said plates. Said plates include frosted edges which refract light created by the LEDs thereby accentuating said edges with highly visible light. In a similar vein, words or logos can be created on surfaces of the plates by means of frosting or beveled engravings. In either case, said frosting or beveled engravings refract light created by the LEDs thereby accentuating the depicted words or logos.

The device is designed to be secured to the top of existing gaming machines within a gaming establishment or may be manufactured directly to new gaming machines.

DESCRIPTION OF THE EMBODIMENTS

Figure 1:
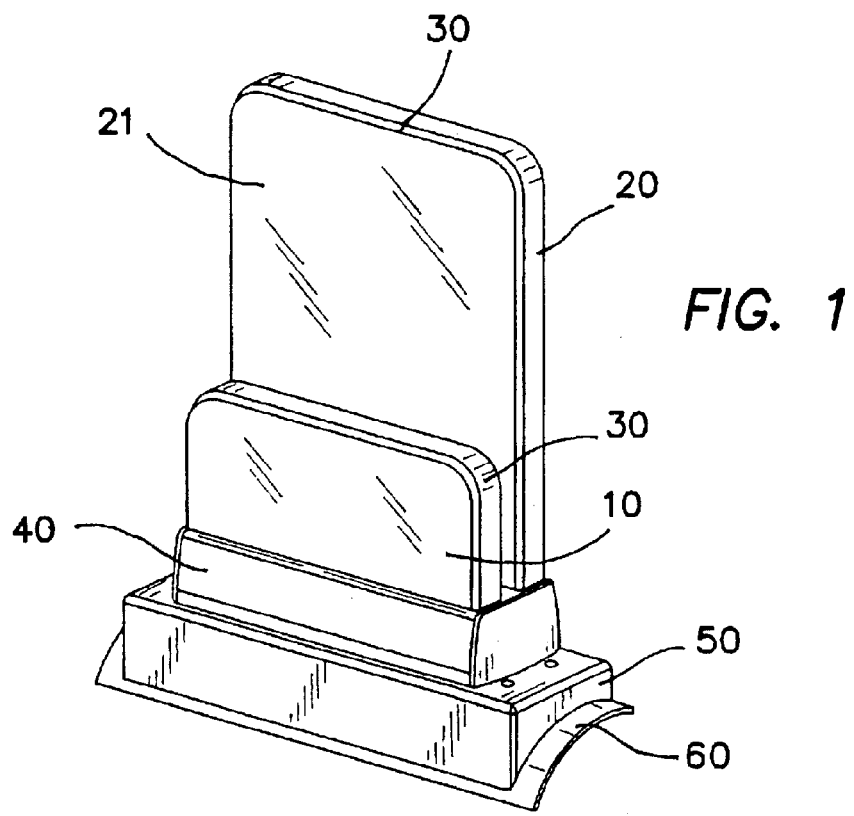
FIG. 1 is a perspective view of the present invention.
Figure 2:
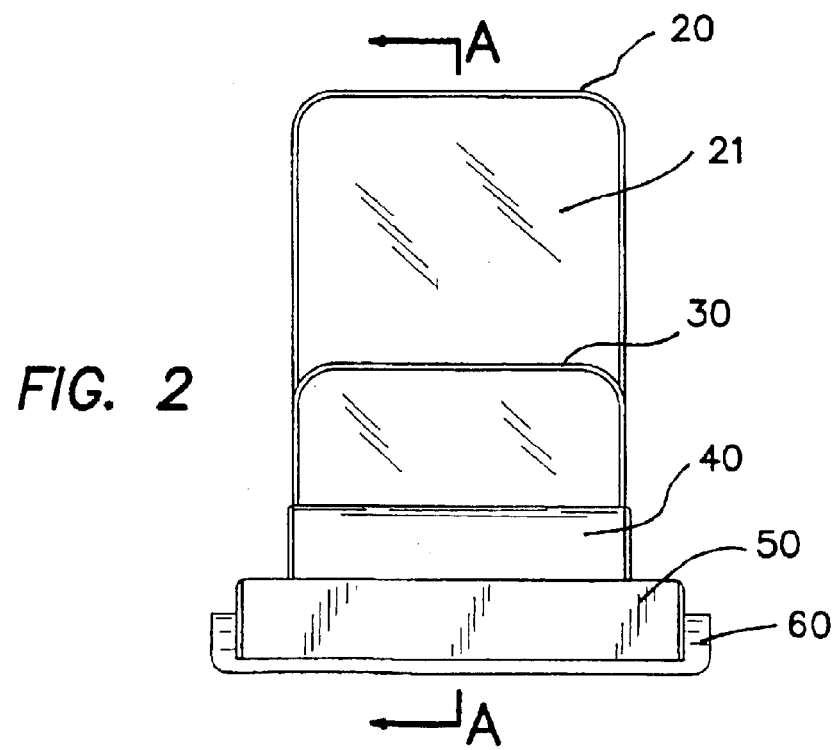
FIG. 2 is a front view of the present invention.

Reference is now made to the figures wherein like parts are referred to by like numerals throughout. FIGS. 1 and 2 show perspective and front views respectively of a gaming machine candle device of the present invention. A first plate 10 and a second plate 20 include frosted or beveled edges 30. An opaque wall member 40 encloses a lower portion of each plate 10, 20 such that inner components of the gaming machine candle device are concealed from view by patrons. Said plates 10, 20 and said opaque wall member 40 are attached to a base unit 50 placed sub-adjacent thereto. The base unit 50 is affixed to a curved platform 60 that attaches to a top of a gaming machine permitting said plates 10, 20 to be viewed throughout a casino environment.

In the preferred embodiment, plates 10, 20 are made of solid plexiglass or acrylic plastic. Plates 10, 20 are similar in design in that both have frosted or beveled edges 30 to refract light created by LEDs 76 placed adjacent lower edges of said plates 10, 20. Said first plate 10 is placed in front of said second plate 20 and is transparent. By using colored plexiglass or plastic the first plate 10 informs patrons of a gaming machine denomination. For example, a first plate 10 made of transparent yellow plastic will display bright yellow light from frosted or beveled areas on said plate 10 identifying a quarter denominated gaming machine. Said second plate 20 is taller than the first plate 10 and is clear. Said second plate 20 may include frosted edges and frosted or beveled words and/or logos on a front surface 21 thereof identifying a manufacturer, operator or the like. Said second plate 20 will also be transparent except for the edges, words and/or logo, which appear white in color, thereby permitting the first plate 10 and its color to be viewed through said second plate 20. Therefore, a patron standing behind a gaming machine will nonetheless be able to determine the denomination of said gaming machine. Viewing said first plate 10 and its color from any location creates the most effective gaming machine candle device for casino patrons.

Moreover, the second plate 20, or more particularly the LEDs, will flash should said gaming machine be opened or otherwise tampered with improperly. Further, a player may signal the attention of an attendant by pushing a button on the gaming machine, as known in the art, that causes the second plate 20 to light.

Figure 3:
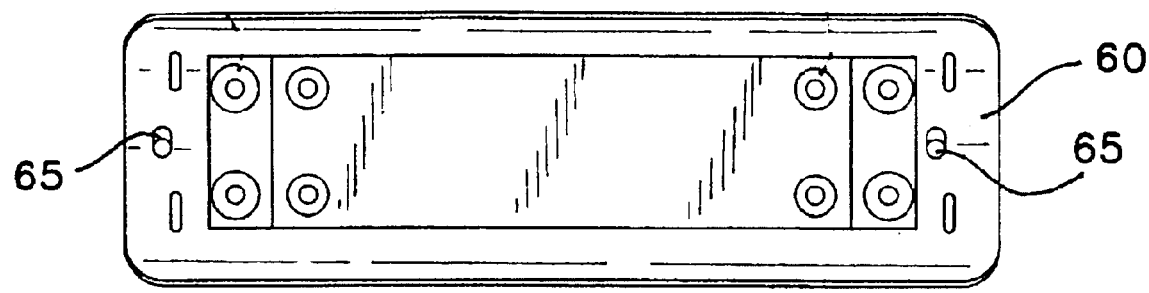
FIG. 3 is a bottom view of the present invention.

FIG. 3 shows a bottom view of the present invention including pem studs 65 used to attach said plates 10, 20 and said opaque wall member 40 to said base 50. Now referring to FIGS. 4 and 5, in a preferred embodiment for attaching the candle device to a gaming machine at the manufacturing level one or more pem studs 65 extending from a lower surface of said curved platform 60 insert into corresponding apertures (not shown) in a top of said gaming machine securing said candle device to the gaming machine. In another embodiment, the curved platform 60 is removed and one or more pem studs extend from a lower surface of the base 50 for insertion into the top of the gaming machine.

Figure 4:
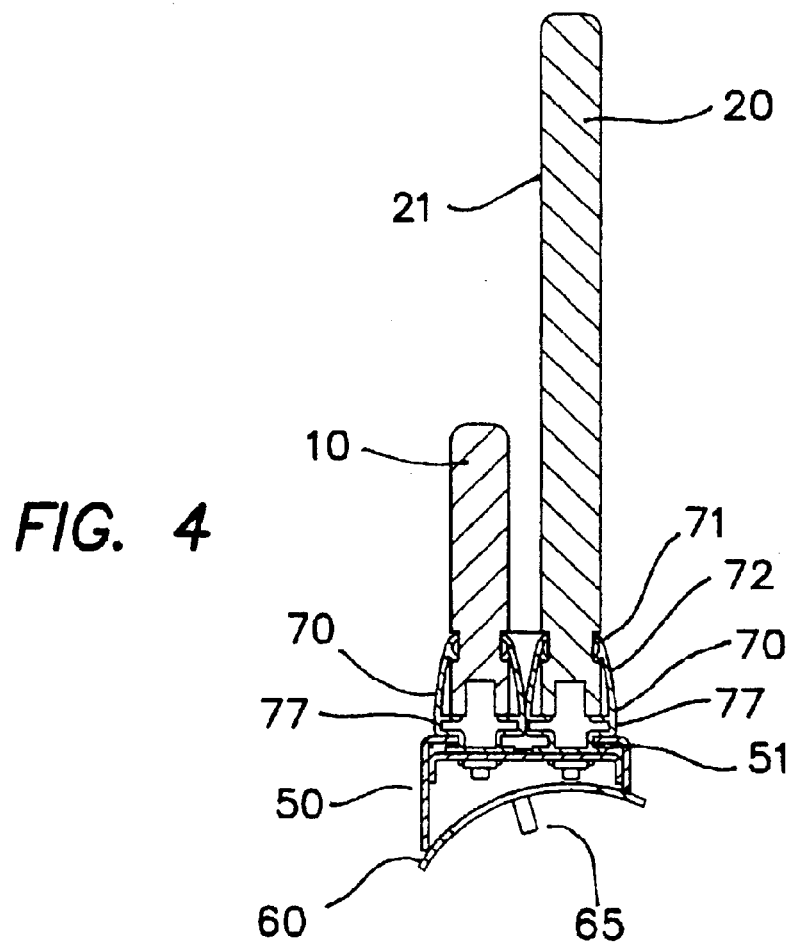
FIG. 4 is a cross-sectional view along direction A illustrated in FIG. 2.
Figure 5:
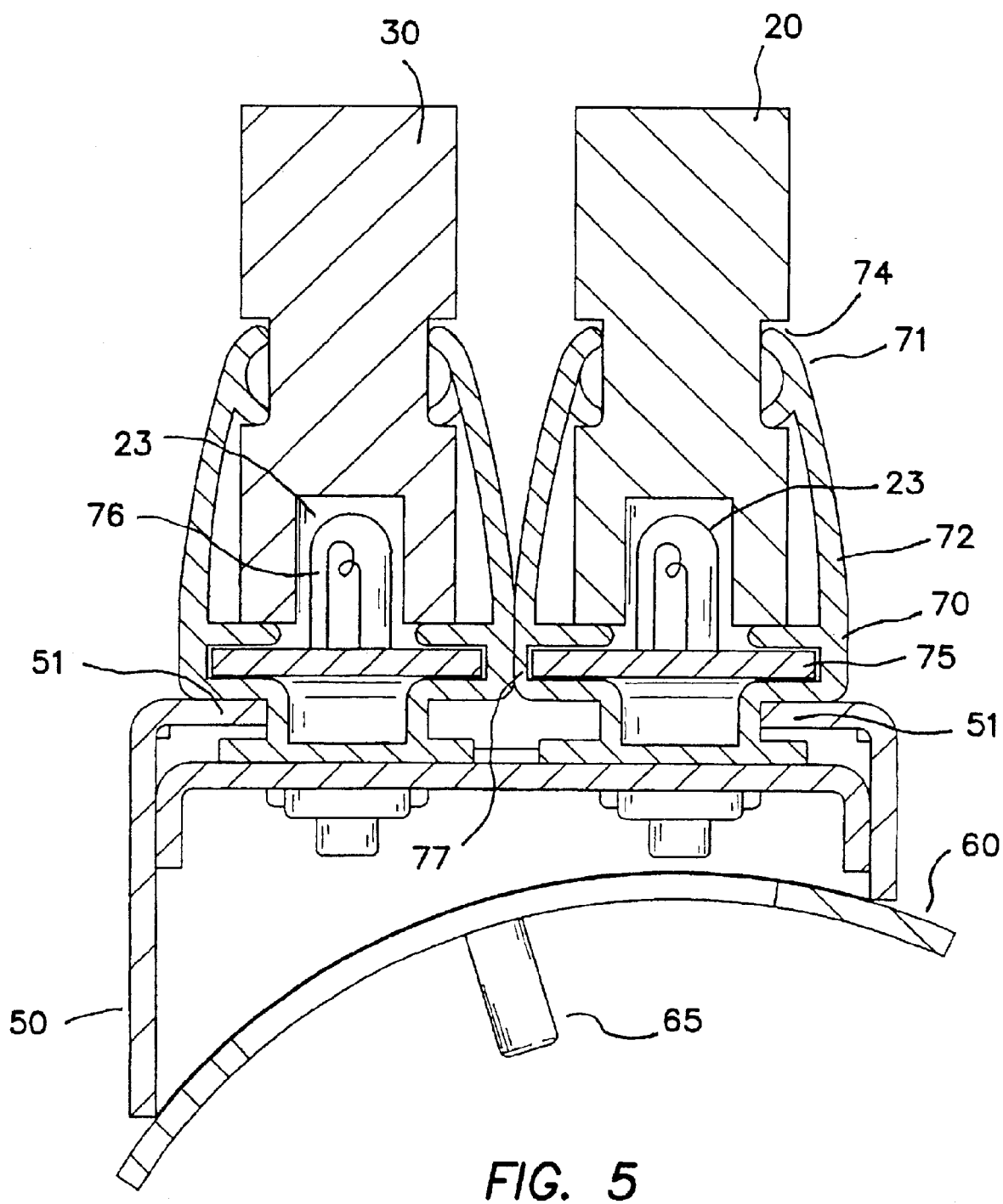
FIG. 5 is a detailed close-up view of the lower section of FIG. 4.

FIGS. 4 and 5 show a cross-sectional side view along direction A of FIG. 2 of the novel candle device disclosed and claimed herein. Two U-shaped clamps 70 removably support plates 10, 20 and LED boards 75, including LEDs 76, and secure to an upper surface of said base unit 50. Said U-shaped clamps 70 run the width of said plates 10, 20 and LED boards 75 to provide maximum support. In the preferred embodiment of the present invention, ends 71 of arms 72 of the U-shaped clamps 70 reside within slots 74 running the width of said plates 10, 20. Channels 77 running the length of said U-shaped clamps 70 grab the LED boards 75 along their length. In the preferred embodiment, several LEDs 76 are placed along a length of said LED board 75 to effectively light said plates 10, 20.

The clamps 70 of the preferred embodiment permit easy installation and removal of said plates 10, 20 and LED boards 75. Said plates 10, 20 or LED boards 75 can be removed or installed by easily sliding them along the length of the clamps 70.

Figure 6:
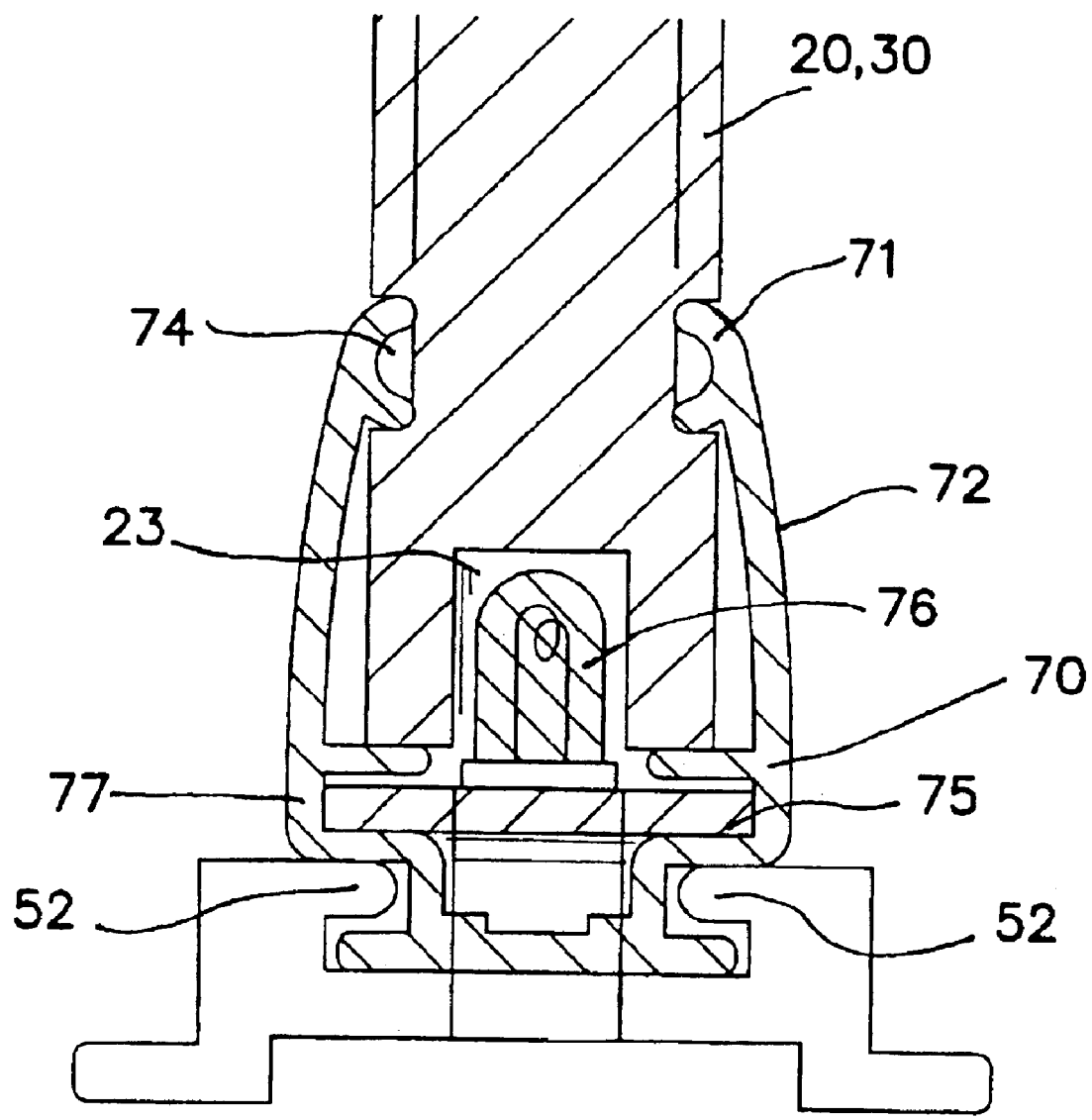
FIG. 6 is a second embodiment of a clamp support means.
Figure 7:
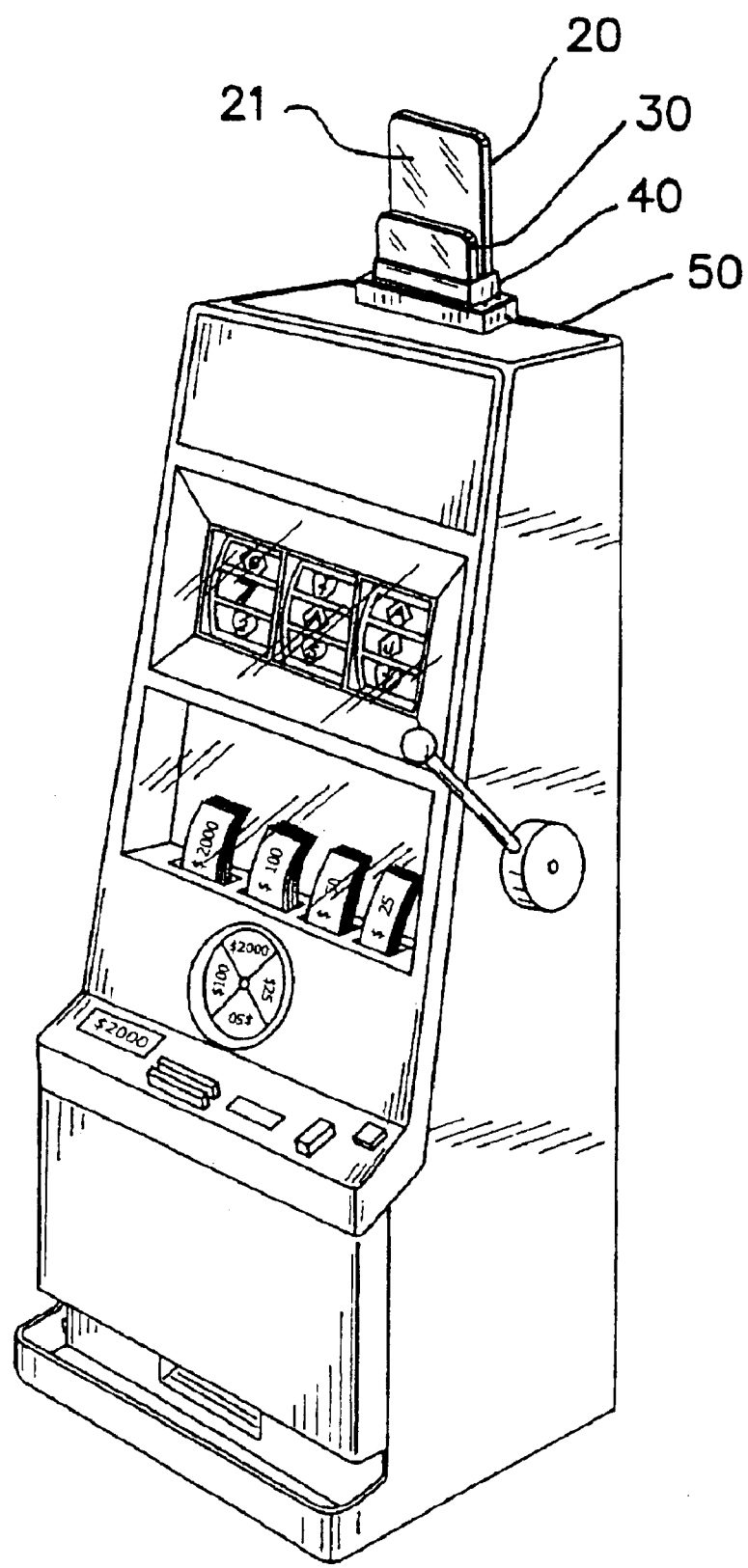
FIG. 7 is a perspective view of the present invention secured atop a gaming machine.

The attachment of the clamps 70 to said base unit 50 is accomplished in a preferred method by inserting two clamps 70 adjacent each other into a space defined by two opposed parallel shelves 51 extending a length of the base unit 50. Said shelves 51 contact, and extend parallel to, lower surfaces of said channels 77 along the length of said clamps 70. The shelves 51 and pressure contact between the clamps 70 secure said plates 10, 20 may be inserted into individual spaces defined by two sets of two opposed shelves 52 on said base unit 50. In a second embodiment as shown in FIG. 6, said clamps 70 may be inserted into individual spaces defined by two sets of two opposed shelves 52 on said base unit 50. In the second embodiment, said clamps 70 do not contact one another but rather are held in place solely by the two shelves 52.

LEDs 76 are placed on rectangular LED boards 75 such that they reside within recesses 23 along a bottom surface of said plates 10, 20 to direct light created by the LEDs 76 upward into said plates 10, 20. LED boards are generally circuit boards, of any desirable shape, which may include LEDs 76, resistors 85 and electrical connection means 86 as depicted in a representative electrical schematic diagram of FIG. 6. Any number of circuit layouts can be used without departing from the scope of the present invention. Said LED boards 75 and the LEDs 76 thereon are connected to, and powered by, the gaming machine's conventional electrical system. In the preferred embodiment, a 12 volt power source drives the LED board 75 and LEDs 76. LEDs can produce different colors depending on the particular method of fabrication including the choice of semiconductor elements. White light producing LEDs and colored plates 10, 20 are preferably used in the present invention to create color schemes. However, color light producing LEDs may also be used with clear plates to create the color schemes of the present invention.

While not shown, it is envisioned that a plurality of transparent colored plates may be combined in parallel to create new colors or to provide a more dramatic effect if desired. Although disclosed as acrylic or plexiglass the transparent colored plates may be fabricated of other plastics, polymers, glasses, etc. Similarly, while the light producing means is preferably LEDs, it may also be produced by means of candescent bulbs or other light sources.

Although the invention has been described in detail with reference to a preferred embodiment and others, additional variations and modifications exist within the scope and spirit of the invention as described and defined in the following claims.

We claim:

1. A gaming machine candle device including:
   one or more translucent panels communicating with light producing means wherein said panels include refraction means for enhancing fragments of said produced light;
   means for supporting each of said panels and light producing means communicating therewith;
   a base unit attached subadjacent to said support means, said support means extending a width of said panels and comprising a support base, channels for receiving said light producing means and two contracting support surfaces extending upward into slots on opposite faces of said panels, said slots running the width of said panels;
   wherein said light producing means is one or more light emitting diodes arranged on a circuit board configured to insert into said channels; and
   means for attaching said base unit to a gaming machine.

2. The gaming machine candle device of claim 1 wherein said translucent panels are acrylic.

3. The gaming machine candle device of claim 1 wherein said translucent panels are plexiglass.

4. The gaming machine candle device of claim 1 wherein said refraction means includes frosting portions of said translucent panels.

5. The gaming machine candle device of claim 1 wherein said refraction means includes engraving portions of said translucent panels.

6. The gaming machine candle device of claim 1 wherein said circuit board is powered by an electrical connection to said gaming machine.

7. The gaming machine candle device of claim 1 wherein said means for attaching said base unit to a gaming machine is one or more pem studs extending from a lower surface of said base unit into an orifice in a top surface of said gaming machine.

8. The gaming machine candle device of claim 7 wherein said one or more pem studs extend from a curved bottom platform surface of said base unit.

9. The gaming machine candle device of claim 1 comprising a first panel and a second panel, said second panel being taller than said first panel and being placed adjacent and behind said first panel.

10. The gaming machine candle device of claim 9 wherein said first panel is colored to indicate a denomination of said gaming machine.

11. The gaming machine candle device of claim 9 wherein said second panel flashes to indicate a concern with said gaming machine.

12. The gaming machine candle device of claim 9 wherein said second panel flashes to indicate a player in need of service.

13. A gaming machine candle device including:
   one or more light emitting diodes arranged within slots on bottom surfaces of a plurality of translucent panels wherein said panels include refraction means for enhancing fragments of light produced by said light emitting diodes;
   a lower portion of each of said panels secured within a corresponding clamping mechanism including two opposing support surfaces wherein said support surfaces embrace said panels, said panels including two grooves running a width along each opposite face of said panels whereby top sections of said support surfaces rest within said grooves;
   said clamping mechanisms connected to an upper surface of a base unit; and
   means for attaching said base unit to a gaming machine.

14. The gaming machine candle device of claim 13 wherein said light emitting diodes are mounted on a circuit board.

15. The gaming machine candle device of claim 14 wherein said circuit board is electrically connected to said gaming machine.

16. The gaming machine candle device of claim 14 wherein said circuit board is supported by channels within said clamping mechanism such that said light emitting diodes are disposed within said slots on bottom surfaces of said plurality of translucent panels.

* * * * *